June 30, 1959     C. P. FROMMELT ET AL     2,892,463
LOADING DOCK SHIELD
Filed May 27, 1954     2 Sheets-Sheet 1
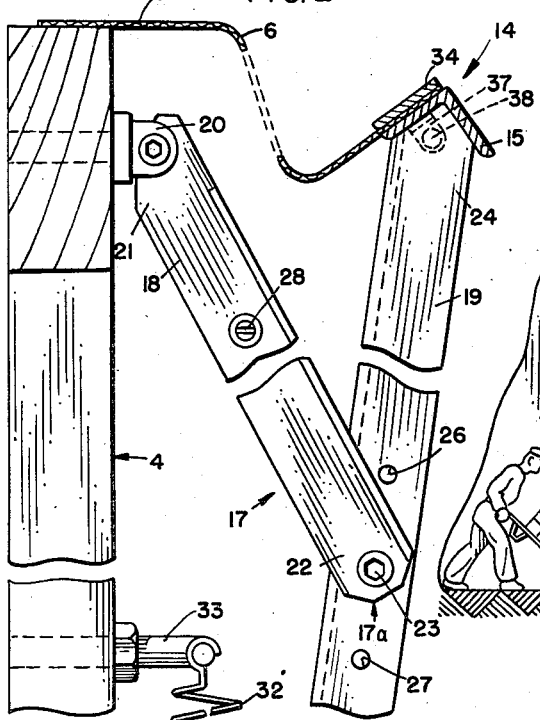
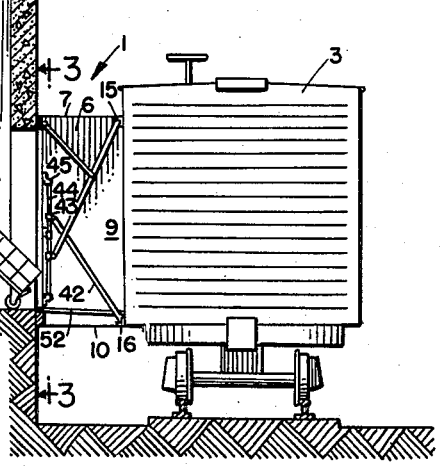
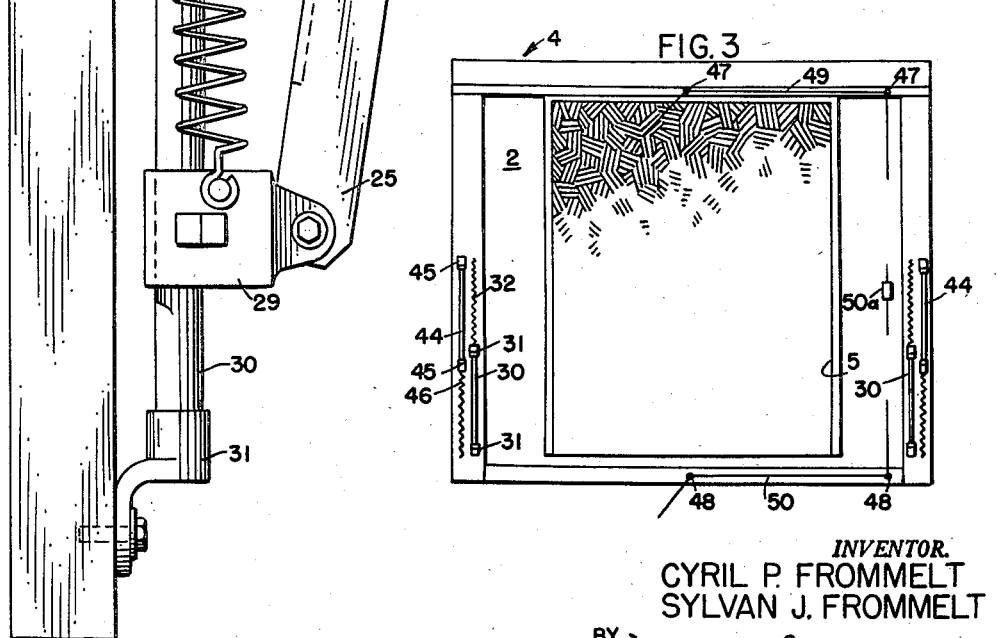
INVENTOR.
CYRIL P. FROMMELT
SYLVAN J. FROMMELT
BY
ATT'YS

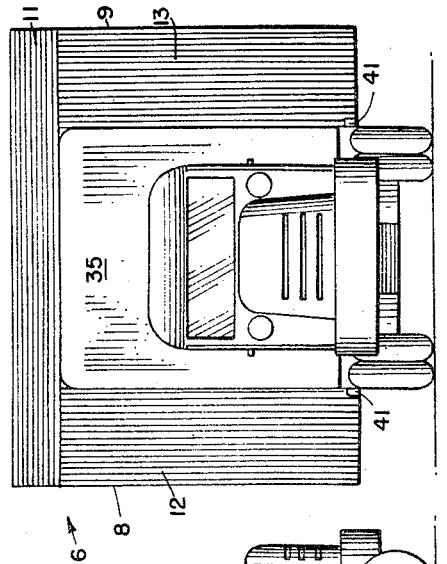
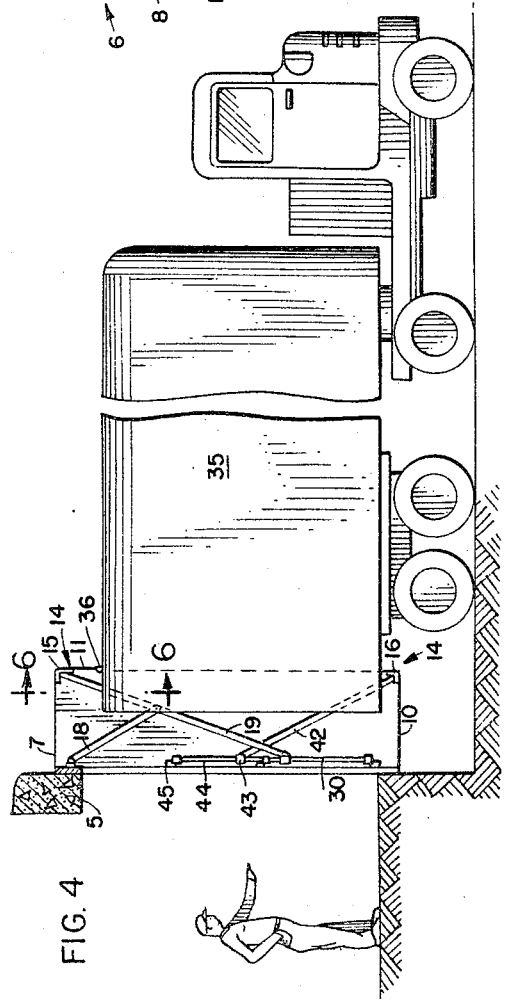
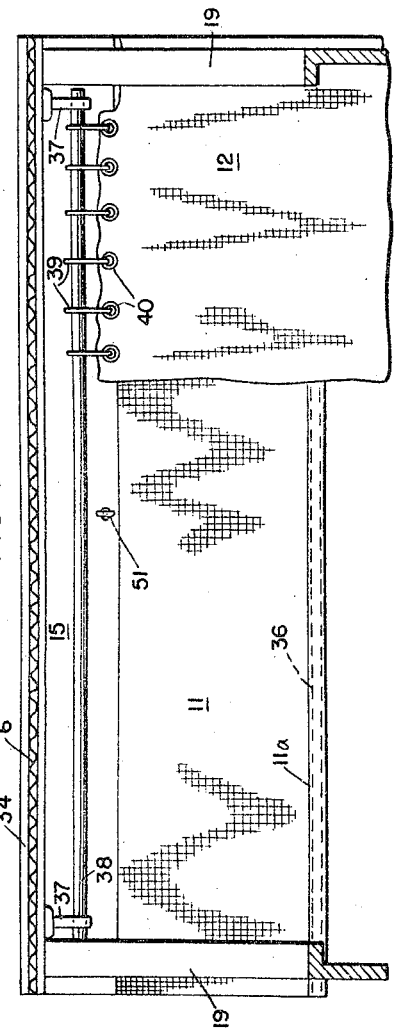

United States Patent Office 2,892,463
Patented June 30, 1959

2,892,463

LOADING DOCK SHIELD

Cyril P. Frommelt and Sylvan J. Frommelt, Dubuque, Iowa, assignors to Dubuque Awning & Tent Company, Inc., Dubuque, Iowa, a corporation of Iowa Application May 27, 1954, Serial No. 432,874

5 Claims. (Cl. 135—5)

This invention relates to loading dock shields for the protection of goods and personnel during loading and unloading operations. The invention is particularly well adapted for mounting on a warehouse, shed, or other building or enclosure, to provide a shield or hood between the enclosure and a vehicle to or from which goods are being transferred.

In loading and unloading operations, it is desirable to protect the merchandise and the workmen from rain, dirt, wind, and so forth, and this is especially important in handling foodstuffs. In handling merchandise intended for human consumption, for example, in loading meat in considerable quantities as is done in the packing industry, it is necessary that all openings be closed between the points of storage and delivery of the goods.

It is an object of the invention to provide improvements in loading dock shields, covers or hoods and to provide a new and improved shield.

An important object is to provide a shield which serves to keep out dirt and dust and which is constructed to keep rain water out of the loading zone.

A particular object is to provide a loading dock shield construction which is adjustable to cause water to drain therefrom as desired, so that it does not enter the enclosed areas.

A further object is to provide an extensible shield which acts to straighten the top portion and, if desired, the bottom portion of the shield, to prevent accumulations of water and to cause them to drain from the shield.

An additional object is the provision of a shield which extends from an enclosure to a vehicle such as a railway car or truck automatically when released, terminating in a position in which the top of the shield is straight. It is also desired to furnish means for adjusting the top of the shield so that it is horizontal or slopes upwardly or downwardly, according to the requirements of the situation.

A still further object is to provide a loading dock shield which is simple and economical yet very effective and which is easily and rapidly mounted on a warehouse or the like in enclosing or circumscribing relation to a doorway or passageway thereof.

Yet another object is to provide a shield which is flexible, being adapted for use with openings of various sizes and with various clearances between a building and a vehicle, and serving to protect the loading operation with a variety of vehicles, such as railway cars and trucks of different dimensions.

It is also an important object to provide a shield that will help maintain the proper temperatures in railway cars and truck trailers. By enclosing the loading area between a building opening and the opening in a vehicle and by covering the openings between the vehicle and the body of the shield, employing a cover that closes the openings around the sides, top and bottom of a trailer, for example, refrigerated cars and trailers are kept at an even temperature. The vehicles thus retain cold air in summer and heated air in winter. The result is that loss of perishable merchandise and refrigeration costs are reduced, and the enclosure furnishes protection that meets governmental specifications. In addition, cold and hot drafts are controlled in the buildings, providing better and safer working conditions and reducing operational, maintenance and repair costs.

These and other objects and advantages of the invention will be apparent on consideration of the specification taken in conjunction with the accompanying drawings, in which like parts are identified by like reference characters in each of the views, and in which:

Figure 1 is a side elevational and sectional view of one embodiment of a loading dock shield according to the invention, being employed in loading a railway car from the loading dock of a warehouse;

Figure 2 is an enlarged side elevational view of a shield mounting and extending construction according to the invention;

Figure 3 is a front elevational view of a frame and associated elements mounted on a building, taken on line 3—3 of Figure 1;

Figure 4 is a side elevational and sectional view of an embodiment of the invention particularly well suited for use in loading trucks;

Figure 5 is a front elevational view of the embodiment of Figure 4; and

Figure 6 is an enlarged fragmentary rear elevational and sectional view of the front head and side curtains and associated elements of a shield, taken on line 6—6 of Figure 4.

In a loading dock shield according to the invention, means are provided for extending the shield, and means associated with the extending means are provided for adjusting the slope of the top of the shield. In a preferred embodiment, means are provided for maintaining a force on the extending means to urge the shield in extended position and straighten the top thereof.

In a very advantageous construction, toggle joint means are furnished for extending the shield, and the toggle joint means are adjustable to vary the slope of the top of the shield. Means are then preferably provided for maintaining a force on the knee of the toggle joint tending to straighten it, thus urging a component of the toggle joint outwardly and vertically to extend the shield and straighten its top.

The complete shield, for mounting on a warehouse or the like in enclosing relation to a doorway, includes an extensible frame and a cover mounted on the frame and adapted for connection to the warehouse, to enclose the doorway. When extended, the shield provides an enclosure projecting outwardly from the warehouse to a vehicle. The cover includes top and side sections and may also include a bottom section and, for use with trucks, a front head curtain and front side curtains arranged for closing the spaces between the truck body and the shield.

Slide rods are provided for connection to the warehouse, ordinarily by means of a frame mounted thereon. Toggle joint means including one or more sets or groups of pivot arms are connected to the extensible frame and are also adapted to be connected to the warehouse, a part thereof being carried by the slide rods. The pivot arms are arranged to extend the frame and thus the shield, so that the top of the cover is straight from the warehouse to the vehicle. The pivot arms in each set are adjustably connected to each other to enable the top of the cover to extend horizontally or to be canted upwardly or downwardly from the warehouse as desired.

Resilient means, such as tension springs, are provided for maintaining upward vertical forces on the pivot arms connected to the slide rods, so that the arms are urged outwardly and upwardly to extend the frame and straighten the top of the cover. The pivot arms are preferably connected to the extensible frame at its upper portion, and in a specific embodiment, extension arms are also provided and connected to the frame at its lower portion, for extending the bottom of the shield. The extension arms may be similar to parts of the toggle joint means and are carried by the same or like slide rods. Resilient means are also provided for maintaining downward vertical forces on the extension arms, so that they are urged downwardly and outwardly to extend the frame and straighten the bottom of the cover.

Referring to the drawings, wherein preferred embodiments of the invention are illustrated, an extensible loading dock shield, cover or hood 1 is depicted in Figure 1 as mounted on the outer wall of a warehouse or loading dock 2 and extending to the side of a railway car 3, in position to be loaded with goods from the warehouse. The shield is secured on a fixed frame 4 of wood or other suitable material of construction which surrounds a doorway 5 in the warehouse, as illustrated particularly in Figure 3. The shield includes a cover 6 having a top section 7, side sections 8 and 9 (see Figure 5) and a bottom section 10. In an embodiment especially adapted for use with trucks, a front head curtain 11 and front side curtains 12 and 13 are also provided.

The shield includes a front or outermost extensible supporting frame 14 which, in the embodiment shown, is constituted of transverse elongated supporting bars or members 15 and 16 located at the top and bottom of the shield, respectively. If desired, the supporting bars may be connected to each other to provide a rectangular front frame; however, the additional construction is ordinarily not necessary. In the form illustrated, the supporting front head and foot bars 15 and 16 are angle irons or L bars or beams, as illustrated more clearly in Figure 2.

Connecting the front frame 14 and the warehouse 2 are a pair of like toggle joints 17, arranged vertically in the same manner along the sides of the doorway 5 and each having a knee 17a, one of the joints being illustrated in detail in Figure 2. Each toggle joint is composed of a fixed, rear or back pivot arm 18 and a vertically movable front pivot arm 19, each arm being illustrated as an angle iron. The fixed pivot arm 18 is pivotally connected to the frame 4 mounted on the warehouse by means of a fixed supporting pivot arm hinge 20 for the top or end 21 of the arm, the hinge being bolted or otherwise suitably fastened to the frame.

The opposite, lower end 22 of the fixed pivot arm 18, which depends from the hinge 20, is pivotally connected to the movable pivot arm 19, intermediate the upper and lower ends 24 and 25, respectively, thereof by means of a pivot pin or bolt 23 passing through corresponding holes or openings in the arms and secured in place, as by means of a lock nut. The toggle joint 17 is formed by the pivot arm 18 and the upper portion, containing the upper end 24, of the movable pivot arm 19. The lower portion of the movable pivot arm acts as a means for transmitting force to the knee 17a of the toggle joint, an upward force on the lower portion tending to straighten the joint.

A plurality of longitudinally spaced holes are furnished in the movable pivot arm 19, three in the form shown, for connecting the pivot arms. In the illustration, the upper hole 26 is employed for connecting the arms when it is desired to slope the top section 7 of the cover 6 downwardly from the warehouse to the vehicle. Use of the central hole, which is in use in the drawing and which is therefore obscured, renders the top section 7 of the cover horizontal, and use of the lowermost hole 27 results in an upwardly sloping top section 7. A stop bolt or pin 28 is secured to the fixed pivot arm 18 to check rearward movement of the movable pivot arm 19 and to balance the shield 1.

The upper end 24 of the front pivot arm 19 is connected to the upper supporting bar 15. The connection is shown to be rigid but may be arranged so that the supporting bar moves or rotates for closer alignment with a vehicle at various distances thereof from the building. The lower or bottom end 25 of the movable pivot arm 19 is pivotally connected to a sliding pivot arm hinge 29 which is carried by or mounted on a vertical pivot arm slide rod 30, for vertical reciprocation of the hinge on the slide rod and thus vertical movement of the movable pivot arm.

The slide rod 30 is held in place by slide rod mounts or supports 31 which are fixed to the back or warehouse frame 4 by bolts, screws or other suitable means. Resilient means in the form of a tension spring 32 is connected to the sliding hinge 29 at one end of the spring and is supported at the other end on spring support bolt 33, affixed to the back frame 4. The spring maintains an upward vertical force on the hinge and thus on the movable pivot arm 19. Like construction and arrangement of the parts is employed on each side of the doorway. In this connection, it is to be noted that numerous variations in construction and arrangement of the parts may be made while still accomplishing the objects of the invention and falling within its scope.

The cover 6, which is of flexible and preferably waterproof material, such as canvas, is secured to the back frame 4 therearound by any suitable means, such as by nails, hooks and the like. The front or outer edges of the cover may also be secured to the extensible frame 14 by any suitable means. In the form illustrated, cover retainer strips or bars 34 are employed to secure the cover to the front frame, the cover passing between the retainers and the supporting bars 15 and 16, and the retainers being clamped, bolted or otherwise connected to the supporting bars.

In the construction designed especially for use with trucks, illustrated in Figures 4–6, the cover 6 also includes the front head curtain 11 which depends from the head supporting bar 15 to rest on the top of a truck 35, and which may form one piece of material with the top section 7. As illustrated in Figure 6, the bottom of the front head curtain 11 may be weighted with a weight 36, which may be a rod, bar or tube. This may be done suitably by folding the bottom edge of the curtain 11 back on itself to form an envelope, loop or tubular opening 11a at the bottom of the curtain, stitching or stapling the envelope in place, and inserting the weight or rod 36 in the envelope 11a thus constructed.

The front side curtains 12 and 13, which may form one piece with the respective side sections 8 and 9, are laterally adjustable to accommodate the width of the truck 35. An advantageous construction for rendering the front side curtains easily adjustable is illustrated in Figure 6 and includes slide rod mounts 37 connected to and depending from the upper supporting bar 15 (see also Figure 2), a front side curtain slide rod 38 which is supported by the slide rod mounts, and a series of rings 39 which are supported by the slide rod and also engage a corresponding series of grommets 40 provided along the upper edges of the side curtains. Weights 41 are fastened to the front side curtains at the bottoms thereof, to assist in maintaining the curtains in their proper positions. The cover 6 may be formed of a number of adjoining separate sections which may be fastened together at their junctures or may be constructed entirely from one large piece of material.

When the cover 6 includes the bottom section 10, the lower or foot supporting bar 16 is employed, the cover is secured thereto in the manner described for securing the cover to the upper supporting bar 15, and a pair of vertically movable extension arms or bars 42 are supplied. The extension arms are connected to the lower supporting bar 16 in the manner described for connecting the movable pivot arms 19 to the upper supporting bar 15. Vertically reciprocatable sliding hinges 43, vertical extension arm slide rods 44, slide rod mounts 45, tension springs 46 and spring support bolts are provided and connected to the upper, inner ends of the extension arms 42 in the same manner as that described for the connection of corresponding members to the movable pivot arms 19, except that the extension arm slide rods are located higher on the back frame 4 and the tension springs 46 exert downward vertical forces on the hinges and on the extension arms. The locations of the slide rods 30 and 44 and of the tension springs 32 and 46 are illustrated in Figure 3. If desired, one slide rod may be provided on each side of the doorway 5 to carry both the corresponding pivot arm and extension arm.

For retracting the loading dock shield 1, a series of pulleys 47 and 48 and cords 49 and 50 are connected to the fixed back frame 4, the cords being connected by a cleat 50a or the like, and the cords are connected to the extensible front frame 14. A cord connection to the upper supporting bar 15 is illustrated in Figure 6 at 51.

In using the invention to provide a protected loading zone between an enclosure and a vehicle, the shield 1 is mounted on the enclosure 2 around the doorway 5, being secured to the back frame 4 serving as a support, which is in turn secured to the building, or being secured directly to parts of the building as the support. The slide rods 30 and 44 are affixed to the frame, the pivot arms 18 and 19 and the extension arms 42 are affixed to their respective hinges, if this has not already been done, the hinges of the fixed arms are secured to the frame, and the hinges of the movable arms are arranged to engage the slide rods if not so arranged in advance. The tension springs 32 and 46 are connected to the back frame and to the corresponding hinges. The remainder of the construction is ordinarily assembled as previously described, so that with these connections, the shield is in position for operation.

The bottom section 10, the front head curtain 11 and the front side curtains 12 and 13 are optionally included in the cover 6, depending upon the intended use. The shield can be made in any suitable dimensions, to accommodate different door and vehicle sizes and spacings. Preferably, the shield is constructed for use in a number of different situations.

Employing the pulleys 47 and 48 and the cords 49 and 50 for that purpose, the extensible frame 14 is maintained in a position adjoining the building 2 when not in use, the flexible cover folding and accommodating itself to the retracted position. When it is desired to use the shield, the cords 49 and 50 are released, and the action of the tension springs 32, exerting upwardly vertical forces on the movable pivot arms 19, causes the movable pivot arms to move the upper supporting bar 15 and the cover 6 attached thereto upwardly. Through the action of the fixed pivot arm 18, the movable pivot arm is also caused to move outwardly, and the supporting bar 15 is projected upwardly and outwardly under these forces until it has reached a position where the top section 7 of the cover is straight or taut.

The slope of the top section 7 of the cover 6 depends upon the relative positions and lengths of the fixed pivot arm 18 and of the parts of the movable pivot arm 19. The arms are connected initially at the bolt hole on the movable arm corresponding to the slope of the top section 7 desired. As described, the position illustrated results in a horizontal top section 7, whereas connection at either end bolt hole 26 or 27 results in a sloping top section, sloping downwardly or upwardly from the building 2, respectively.

Where the extension arms 42, acting to extend the bottom section 10 of the cover 6, and associated structure are provided, the tension springs 46 act to move the arms downwardly. When the upper and lower supporting bars 15 and 16 are connected to each other in the extensible frame 14, the outward movement imparted to the upper bar serves to move the lower bar outwardly at the same time, so that the force of the tension springs 46 acts through the extension arms and the lower bar to straighten the lower section 10. In any event, with the cover 6 completely encircling the doorway, being formed in one piece or having its sections joined to each other, the restrictive nature of the cover directs the extension arms 42 outwardly to straighten the bottom section 10.

In the case of loading a railway car, the shield is then ready for loading operations. If a truck is to be loaded or unloaded, the front head curtain 11 is dropped to the truck top, and the front side curtains 12 and 13 are pulled against the sides of the truck. A plate or platform 52 (Figure 1) is laid in position bridging the space between the warehouse floor and the vehicle floor, and loading operations are carried out. When loading is completed, the shield is retracted by pulling the cords 49 and 50 to return the front frame 14 to a position adjoining the building, the movable pivot arms being checked in their rearward movement by the stop bolts 28 provided on the fixed pivot arms 18.

The foregoing preferred construction, arrangement and mode of operation may be altered in a number of ways to provide the results and advantages of the invention while falling within its intent and scope, as is readily apparent, and the invention is not limited to the specific details described and illustrated.

There is thus provided by the invention a very effective loading dock shield which serves to keep water, dirt and dust out of the loading zone between the enclosures, as well as out of the enclosures, sealing the zone very closely to keep the goods clean and dry and to protect personnel. The shield is an effective aid to sanitation and meets the requirements for foodstuff handling. It serves to maintain the proper temperatures in refrigerated vehicles and in buildings, and prevents objectionable drafts. It is simply and economically constructed and is portable and versatile in nature, thus being readily available for various applications. The shield is rapidly and easily operated, positioning itself correctly with no need for alterations and adjustments after its extension to a vehicle.

The invention is hereby claimed as follows:

1. An extensible loading dock shield for mounting on a warehouse or the like in enclosing relation to a doorway thereof comprising an extensible frame; a cover mounted on said frame and adapted to be connected to said warehouse along the top, sides and bottom of said doorway to provide an enclosure projecting outwardly from the warehouse; slide rods adapted to be connected to said warehouse and arranged vertically along each side of said doorway; toggle joint means connected to said frame and adapted to be connected to said warehouse for extending the frame, said toggle joint means comprising a pair of fixed pivot arms adapted to be pivotally connected at one end to said warehouse and depend therefrom, and a pair of vertically movable pivot arms pivotally connected intermediate their ends to said fixed arms and adapted to be pivotally and vertically slidably connected at one end to said slide rods, said movable arms being connected at their opposite ends to the upper portion of said frame with the latter ends higher than the movably connected ends when connected to said slide rods, said fixed arms being adjustably connected to said movable arms for varying the slope of the top of said cover; a pair of vertically movable extension arms adapted to be pivotally and vertically slidably connected at one end to said slide rods and being connected at their opposite ends to the lower portion of said frame with the latter ends lower than the movably connected ends thereof when connected to said slide rods; resilient means for maintaining upward vertical forces on said slidably connected movable pivot arm ends, whereby said movable pivot arms are urged upwardly and outwardly to extend said frame and draw tight the top of said cover; and resilient means for maintaining downward vertical forces on said slidably connected extension arm ends, whereby said extension arms are urged downwardly and outwardly to extend said frame and draw tight the bottom of said cover.

2. An extensible loading dock shield for mounting on a warehouse or the like in enclosing relation to a doorway thereof comprising an extensible frame; a cover mounted on said frame and adapted to be connected to said warehouse along the top, sides and bottom of said doorway to provide an enclosure projecting outwardly from the warehouse; toggle joint means connected to the upper portion of said frame and adapted to be connected to said warehouse for extending the upper portion of said frame; means for maintaining a spreading force on the toggle joint means sufficient to extend it and thereby the upper portion of said frame and the cover portion attached thereto from their fully retracted positions to their fully extended positions and then to continue to provide an extending force on them; extension means connected to the lower portion of said frame and adapted to be connected to said warehouse for extending the lower portion of said frame; and means for maintaining a force on said extension means sufficient to extend it and thereby the lower portion of said frame and the cover portion attached thereto from their fully retracted positions to their fully extended positions and then to continue to provide an extending force on them.

3. An extensible loading dock shield for mounting on a warehouse or the like in enclosing relation to a doorway thereof comprising an extensible frame; a cover mounted on said frame and adapted to be connected to said warehouse along the top, sides and bottom of said doorway to provide an enclosure projecting outwardly from the warehouse; toggle joint means connected to the upper portion of said frame and adapted to be connected to said warehouse for extending the upper portion of said frame, said toggle joint means being adapted for adjusting the slope of the top of said cover to any one of upwardly sloping, horizontal, and downwardly sloping positions; means for maintaining a spreading force on the toggle joint means sufficient to extend it and thereby the upper portion of said frame and the cover portion attached thereto from their fully retracted positions to their fully extended positions and then to continue to provide an extending force on them; extension means connected to the lower portion of said frame and adapted to be connected to said warehouse for extending the lower portion of said frame; and means for maintaining a force on said extension means sufficient to extend it and thereby the lower portion of said frame and the cover portion attached thereto from their fully retracted positions to their fully extended positions and then to continue to provide an extending force on them.

4. An extensible loading dock shield for mounting on a warehouse or the like in enclosing relation to a doorway thereof comprising an extensible frame; a unitary cover mounted on said frame and adapted to be connected to said warehouse along the top and sides of said doorway to provide an enclosure projecting outwardly from the warehouse and to fold adjacent said warehouse in the retracted position of said frame; toggle joint means connected to the upper portion of said frame and adapted to be connected to said warehouse for extending the upper portion of said frame, said toggle joint means comprising a fixed pivot arm adapted to be pivotally connected at one end to said warehouse and depend therefrom, and a vertically movable pivot arm pivotally connected intermediate its ends to said fixed arm and adapted to be pivotally and vertically movably connected at one end to said warehouse, said movable arm being connected at its opposite end to the upper portion of said frame with the latter end higher in each position thereof than said movably connected end when connected to said warehouse, said fixed arm being adjustably connected to said movable arm for varying the slope of the top of said cover; and means connectable to said warehouse for maintaining an upward vertical force on said movably connected pivot arm end, whereby said movable pivot arm is urged upwardly and outwardly to extend the upper portion of said frame and the cover portion attached thereto from their fully retracted positions to their fully extended positions and then to continue to provide an extending force on them.

5. An extensible loading dock shield for mounting on a warehouse or the like in enclosing relation to a doorway thereof comprising an extensible frame; a cover mounted on said frame and adapted to be connected to said warehouse along the top and sides of said doorway to provide an enclosure projecting outwardly from the warehouse; toggle joint means connected to said frame and adapted to be connected to said warehouse for extending the upper portion of the frame; means for maintaining a spreading force on said toggle joint means sufficient to extend it and thereby said upper portion of the frame and the upper portion of said cover attached thereto from their fully retracted positions to their fully extended positions and then to continue to provide an extending force on them; and extension means operatively connected to the lower portion of said cover and adapted to be connected to said warehouse for extending said lower cover portion.

References Cited in the file of this patent
UNITED STATES PATENTS

| 419,580 | Allen | Jan. 14, 1890 |
| 1,076,310 | Pennington | Oct. 21, 1913 |
| 1,705,266 | Pease et al. | Mar. 12, 1929 |
| 1,742,437 | Davenport | Jan. 7, 1930 |
| 1,959,700 | Anton | May 27, 1934 |
| 2,050,835 | Fogh | Aug. 11, 1936 |
| 2,567,995 | Eshnaur | Sept. 18, 1951 |
| 2,682,274 | Miller | June 29, 1954 |